US 8,121,053 B2

(12) United States Patent
Lu

(10) Patent No.: US 8,121,053 B2
(45) Date of Patent: Feb. 21, 2012

(54) MULTI-RADIO WIRELESS MESH NETWORK SOLUTIONS

(75) Inventor: Wenchen Lu, Saratoga, CA (US)

(73) Assignee: ArrowSpan, Inc., Santa Clara, CA (US)

( * ) Notice: Subject to any disclaimer, the term of this patent is extended or adjusted under 35 U.S.C. 154(b) by 245 days.

(21) Appl. No.: 12/470,376

(22) Filed: May 21, 2009

(65) Prior Publication Data

US 2009/0232026 A1 Sep. 17, 2009

Related U.S. Application Data

(63) Continuation-in-part of application No. 12/124,961, filed on May 21, 2008, now Pat. No. 7,912,063, which is a continuation-in-part of application No. 12/124,965, filed on May 21, 2008, now Pat. No. 7,773,542.

(60) Provisional application No. 61/055,107, filed on May 21, 2008, provisional application No. 60/939,314, filed on May 21, 2007.

(51) Int. Cl.
*H04L 12/28* (2006.01)
*H04L 12/56* (2006.01)
*H04W 4/00* (2009.01)
*H04W 40/00* (2009.01)

(52) U.S. Cl. ........ 370/254; 370/255; 370/331; 370/401; 455/447

(58) Field of Classification Search .......... 370/254–310, 370/331–354, 389–409; 455/453–556, 447
See application file for complete search history.

(56) References Cited

U.S. PATENT DOCUMENTS

| | | | | |
|---|---|---|---|---|
| 7,460,489 B2* | 12/2008 | Sugiarto et al. | | 370/254 |
| 7,489,932 B2* | 2/2009 | Chari et al. | | 455/447 |
| 7,496,078 B2* | 2/2009 | Rahman | | 370/338 |
| 7,711,004 B2* | 5/2010 | Xu | | 370/468 |
| 7,885,243 B2* | 2/2011 | da Costa et al. | | 370/338 |
| 2005/0068970 A1* | 3/2005 | Srikrishna et al. | | 370/400 |
| 2006/0242457 A1* | 10/2006 | Roy et al. | | 714/12 |
| 2007/0189249 A1* | 8/2007 | Gurevich et al. | | 370/338 |
| 2008/0112363 A1* | 5/2008 | Rahman et al. | | 370/331 |
| 2008/0205420 A1* | 8/2008 | Srikrishna et al. | | 370/401 |
| 2009/0285124 A1* | 11/2009 | Aguirre et al. | | 370/255 |
| 2010/0172265 A1* | 7/2010 | Wheeler et al. | | 370/252 |

* cited by examiner

Primary Examiner — Man Phan
(74) Attorney, Agent, or Firm — Blakely Sokoloff Taylor & Zafman LLP

(57) ABSTRACT

Techniques for providing multi-radio wireless mesh network solutions are described herein. According to one embodiment, routing information of neighboring mesh APs is monitored via a dedicated monitoring antenna of a current mesh access point (AP). The current mesh AP is one of mesh APs of a wireless mesh network, each having an uplink antenna, a downlink antenna, a local link antenna, and a monitoring antenna. Traffic of an uplink antenna of the wireless mesh AP is dynamically reconfigured and rerouted from a first routing path coupled to a first uplink mesh AP to a second routing path coupled to a second uplink mesh AP, if the second routing path has a better routing condition than the first routing path based on the monitored routing information associated with the first uplink mesh AP and the second uplink mesh AP. Other methods and apparatuses are also described.

15 Claims, 12 Drawing Sheets

MULTI-RADIO WIRELESS MESH NETWORK SOLUTIONS

RELATED APPLICATION

This application claims the priority of U.S. Provisional Patent Application No. 61/055,107, filed May 21, 2008. This application is also a continuation-in-part (CIP) of U.S. patent application Ser. No. 12/124,961, filed May 21, 2008, now U.S. Pat. No. 7,912,063, which claims priority from U.S. Provisional Patent Application No. 60/939,314, filed May 21, 2007. This application is also a continuation-in-part (CIP) of U.S. patent application Ser. No. 12/124,965, filed May 21, 2008, now U.S. Pat. No. 7,773,542. The disclosure of the above-identified applications is incorporated by reference herein in its entirety.

FIELD OF THE INVENTION

The present invention relates generally to wireless networks. More particularly, this invention relates to multi-radio wireless mesh network solutions.

BACKGROUND

Wireless mesh networks are gaining popularity because wireless infrastructures are typically easier and less expensive to deploy than wired networks. The wireless mesh networks typically include wired gateways that are wirelessly connected to wireless nodes, or wireless connected directly to client devices. Many wireless nodes can collectively provide a wireless mesh, in which client devices can associate with any of the wireless nodes.

Typically, the wireless nodes are implemented as wireless access points (APs). A typical wireless AP includes a local link interface to communicate with local client devices and a downlink and uplink interfaces to communicate with other APs. Conventional APs utilize the same communication frequency when communicating with other APs. As a result, there may be an interference between an uplink and a downlink communications and may have impact on the signal quality. In addition, communications between the wireless APs typically are in a form of plain text which may be vulnerable to be attacked.

SUMMARY OF THE DESCRIPTION

Techniques for providing multi-radio wireless mesh network solutions are described herein. According to one embodiment, routing information of neighboring mesh APs is monitored by monitoring logic via a dedicated monitoring antenna of a current mesh access point (AP). The current mesh AP is one of mesh APs of a wireless mesh network. Each of the mesh APs includes an uplink antenna to communicate with an uplink mesh AP, a downlink antenna to communicate with a downlink mesh AP, a local link antenna to communicate with a local client of each mesh AP, and a monitoring antenna for monitoring neighboring mesh APs. Traffic of an uplink antenna of the wireless mesh AP is dynamically reconfigured and rerouted from a first routing path coupled to a first uplink mesh AP to a second routing path coupled to a second uplink mesh AP, if the second routing path has a better routing condition than the first routing path based on the monitored routing information associated with the first uplink mesh AP and the second uplink mesh AP obtained via the dedicated monitoring antenna of the mesh AP.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
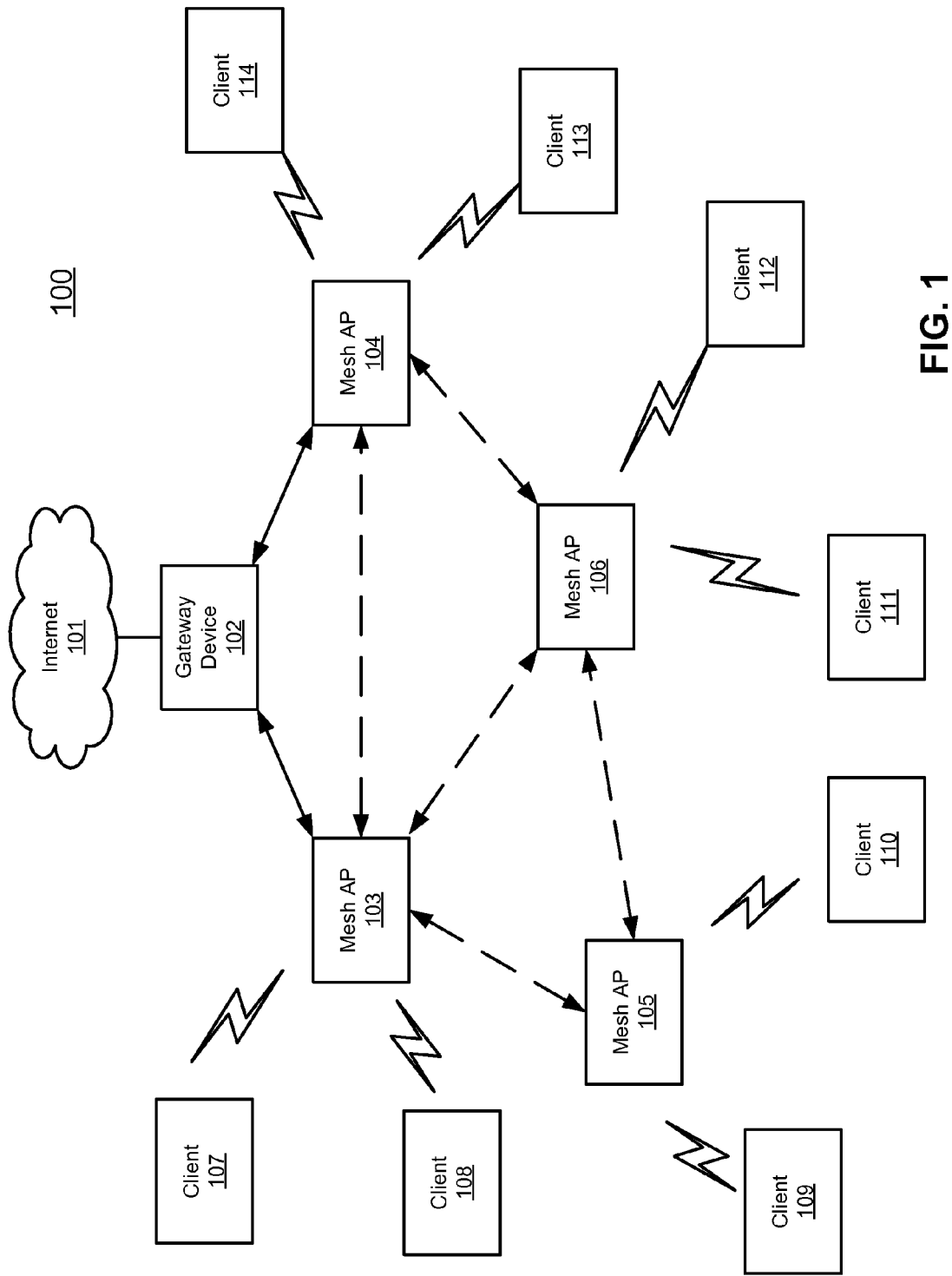
FIG. 1 is a block diagram illustrating an example of a wireless mesh network configuration which may be used with an embodiment of the invention.

Techniques for providing multi-radio wireless mesh network solutions are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According certain embodiments of the invention, multiple wireless path design is provided for both backhaul (e.g., also referred to as a mesh link among multiple mesh APs) and user traffic (e.g., also referred to as a client link between an AP and a local end-user client) to eliminate adjacent AP signal interference degradation. There has been provided a best network throughput via layer 2 fast switching and bridging from AP (access point) to AP to support real time video, voice, and data applications. It is fully compatible with existing access servers, routers, and gateways since existing drivers and layer 3 applications are not modified. It is transparent to layer 3 and up protocols and thus, it is fully compatible with existing network infrastructure or equipments. An AP is directly connected to existing routers, gateways, or AP through, for example, 10/100 Ethernet. The management and security software architecture is configured to support Web based browser and SNMP (simple network management protocol). It also supports WEP (wireless encryption protocol) encryption security across wireless mesh network. Multiple APs can be coupled to each other based on a mesh ID assigned by a user or administrator.

In one embodiment, each node includes multiple wireless interfaces or antennas. For example, a node in a mesh network may include a local AP antenna that operates as an AP for local clients (e.g., end-user clients such as laptop computers, etc.) In addition, the node may further include multiple mesh link AP antennas, one for uplink and one for down link. An uplink interface is configured to communicate with a downlink interface of another node and likewise, a downlink interface of a node is configured to communicate with an uplink interface of another node. Separate channels (e.g., different communication frequencies) are used for uplink and downlink. As result, air link interference can be greatly reduced.

According to another embodiment of the invention, software architecture utilizes existing wireless architecture such as IEEE 802.11 WiFi client and AP drivers, to achieve WIFi mesh network design. As a result, the system can maintain most of the features of WiFi client driver and WiFi access point driver so that it is fully compatible with certain third party products while creating a mesh WiFi network. For example, the software architecture includes an additional layer (also referred to herein as layer 2.5) between ordinary layer 2 and layer 3 of a network stack to process data received from layer 2 driver before delivering the data to ordinary layer 3 or alternatively, sending the data back down to layer 2 without sending the data to layer 3, dependent upon specific system design. As a result, third party layers 2 and 3 can be utilized without having to modify a specific driver of a third party vendors.

Further, according to a further embodiment, tunneling is designed to transfer data packets from one node to another node going through standard WiFi client and AP design. For example, each node includes a common AP interface to communicate with multiple clients, where each client communicates with the node via a tunneling technique using the common AP interface. Thus, when a node receive a data packet from a client via normal WiFi client/AP communication protocol, the specific data associated with the sender is encrypted using a variety of data encryption techniques and tunneled within the standard WiFi packets. The receiving node then may decrypt the data packets to reveal who is the actual sender. Further, each node that communicates with the AP interface of a particular node may appear as a virtual node in the particular node.

According to a further embodiment, each node in a WiFi mesh network includes a routing module (also referring to as a bridging module) and a database. The database is used to store information of other nodes which may be collected (e.g., learned) during communications with other nodes including, for example, signal strength, MAC (media access control) addresses, link status, and mesh links (e.g., parent and/or child nodes). The information stored in the database may be used to determine the best route to route the data packets. For example, each node may be assigned with a mesh ID by a user or an administrator. Under certain circumstances, only those nodes having the identical mesh ID may be grouped in a mesh network. Further, the signal strength information may be used to identify the adjacent nodes in the mesh network to determine the shortest route to an AP.

According another embodiment, if a first node has too many hop counts to a master node, and a second node has less hop counts, the first and second nodes may communicate with each other to "relocate" certain routes from the first node to the second node for the load balancing purposes.

In one embodiment, each AP includes a dedicated wireless interface or antenna to actively monitor operations such as routing information of neighboring APs in order to determine an optimum route for its associated uplink path, downlink path, and local link path. That is, each AP includes at least four wireless interfaces or antennas: 1) uplink interface; 2) downlink interface; 3) lock link interface; and 4) monitoring interface. The monitoring logic within an AP actively monitors via the corresponding dedicated wireless interface all mesh links associated with the corresponding AP. If a better routing path is available, the traffic may be rerouted to the better routing path for the corresponding uplink, downlink, and/or local link of the respective AP to optimize the mesh network quality.

FIG. 1 is a block diagram illustrating an example of a wireless mesh network configuration which may be used with an embodiment of the invention. Referring to FIG. 1, wireless mesh network configuration 100 includes, but is not limited to, multiple mesh APs 103-106 communicatively coupled to each other as depicted via dash communication links. Some of the APs such as APs 103-104 may be coupled via a wired network to a gateway device 102 which allows traffic from the wireless mesh network to reach an external network or another network 101 such as wide area network (WAN), which may be the Internet.

Each of the APs 103-106 includes a local AP link to communicate with local clients (e.g., end-user clients) 107-114. Each of the clients 107-114 may be associated with any of the APs 103-106, which may be statically assigned by an administrator or alternatively, via roaming dynamically. In this example, clients 107-108 are associated with AP 103; clients 109-110 are associated with AP 105, clients 111-112 are associated with AP 106; and clients 113-114 are associated with AP 104 respectively.

According to one embodiment, each of the APs 103-106 includes an uplink interface or antenna and a downlink interface or antenna. An uplink interface of one AP is used to communicate with a downlink interface of another AP. Similarly, a downlink interface of one AP is used to communicate with an uplink interface of another AP. For example, an up link interface of AP 105 may be used to communicate with a downlink interface of AP 103. Likewise, a downlink interface of AP 105 may be used to communicate with an uplink interface of AP 106.

According to one embodiment, communication frequencies for the uplink interface and downlink interface of a particular AP may be different which may be selected or configured by an administrator statically or dynamically (e.g., auto discovery or via frequency hopping). In this way, each backhaul communication link between two APs may have different frequency which greatly reduces the interference.

Furthermore, according to another embodiment, data between two APs may be securely communicated via a tunneling technique. For example, when an AP receives a packet from a local end-user client, the AP may tunnel the packet by encrypting at least the source and destination MAC (media access control) addresses as well as the payload of the packet into a payload of a new packet. The new packet is then package with a new set of source and destination MAC addresses, where the new source MAC address is associated with the AP itself while the destination MAC address is associated with another AP (e.g., next hop). As a result, the new packet can be layer-2 routed to the next AP identified by the new destination MAC address.

When the next hop AP receives the tunneled packet, the next hop AP strips out or removes the source and destination MAC addresses and decrypt the payload of the tunneled packet to reveal the original packet from the end user client. The next hop AP then examines the original destination MAC address to determine whether the destination end-user client is a local end-user client of the next hop AP. If the destination end-user client is a local end-user client, the original packet is transmitted to the identified local end-user client. If the destination end-user client is not a local end-user client, the AP then repackages or re-tunnels the original packet and sends the tunneled packet to another next hop AP, and so on.

In addition, according to one embodiment, at least one AP includes a dedicated wireless interface or antenna to actively monitor operations such as routing information of neighboring APs in order to determine an optimum route for its associated uplink path, downlink path, and local link path. That is, at least one AP includes at least four wireless interfaces or antennas: 1) uplink interface; 2) downlink interface; 3) lock link interface; and 4) monitoring interface. The monitoring logic within an AP actively monitors via the corresponding dedicated wireless interface all mesh links associated with the corresponding AP. If a better routing path is available, the traffic may be rerouted to the better routing path for the corresponding uplink, downlink, and/or local link of the respective AP to optimize the mesh network quality. Other configurations may exist.

Figure 2:
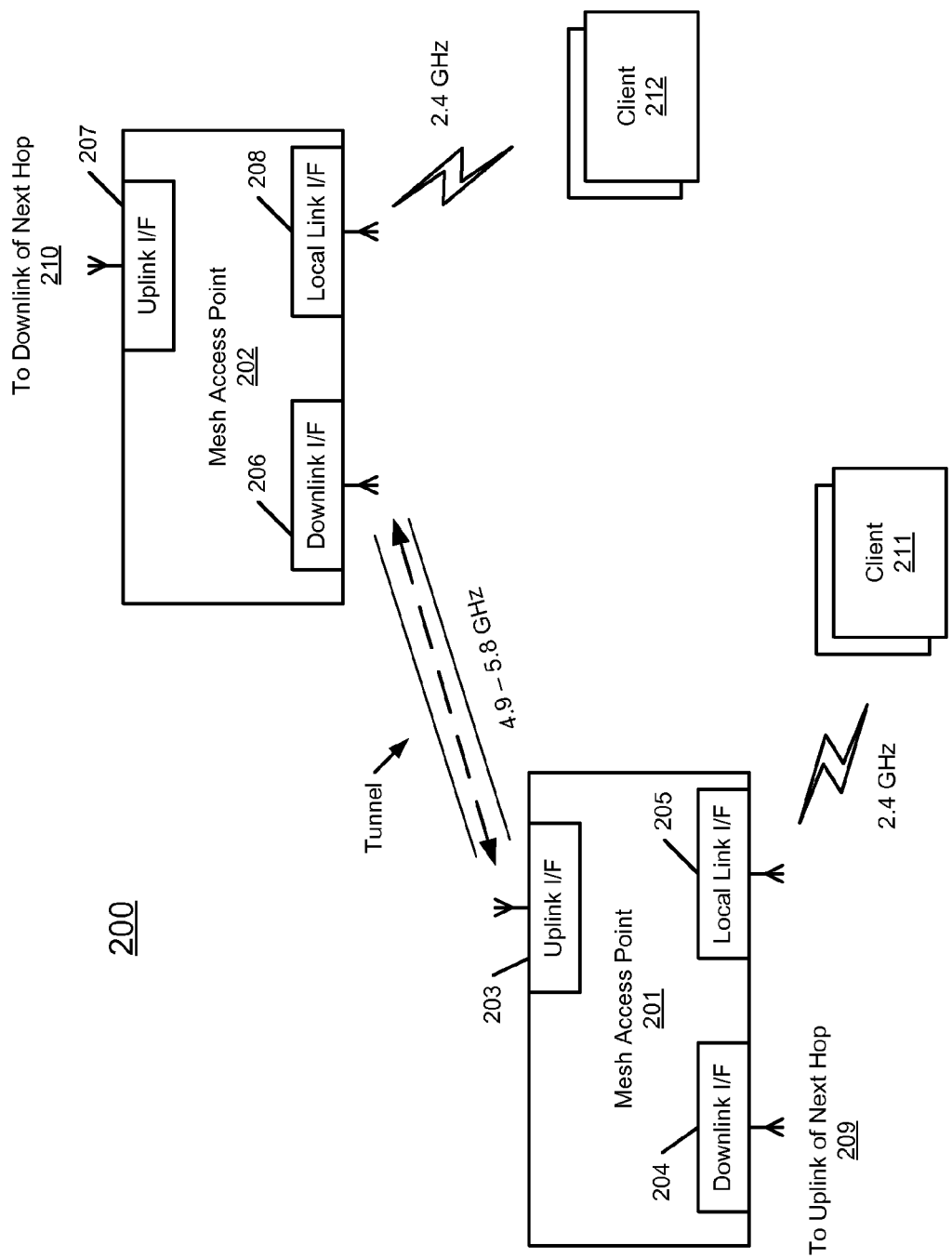
FIG. 2 is a block diagram illustrating inter-mesh AP communications according to one embodiment of the invention.

FIG. 2 is a block diagram illustrating inter-mesh AP communications according to one embodiment of the invention. For example, APs 201-202 may be implemented as any of APs 103-106 of FIG. 1. Referring to FIG. 2, AP 201 includes an uplink interface 203 and a downlink interface 204, as well as a local link interface 205 for local clients 211. Similarly, AP 202 includes an uplink interface 207, a downlink interface 206, and a local link interface 208 for local clients 212. Downlink interface 204 of AP 201 is used to communicate with an uplink interface of a next hop 209. Uplink interface 207 of AP 202 is used to communicate with a downlink interface of a next hop 210. Uplink interface 203 is used to communicate with a downlink interface 206 of AP 202.

Typically, a local link interface communicates with a local client using a communication frequency of approximately 2.4 GHz using a standard wireless protocol such as, for example, IEEE 802.11b/g protocol. The communication frequency of the backhaul or mesh link communications is ranging approximately from 4.9 to 5.8 GHz using a standard wireless protocol such as, for example, IEEE 802.11a protocol. However, according to one embodiment, each mesh link may operate at a different communication frequency. For example, with respect to a particular AP, the communication frequency of a downlink interface is different than the communication frequency of an uplink interface. As a result, air interference is greatly reduced.

Furthermore, the communications between downlink interface 206 of AP 202 and uplink interface 203 of AP 201 are securely performed using a tunneling protocol and/or a variety of encryption techniques. For example, when AP 201 receives a packet form a local client 211, the AP 201 encrypts almost the entire packet to generate a new packet having a source MAC address of AP 201 and a destination MAC address of AP 202. The new packet is then routed from AP 201 to AP 202 via uplink interface 203 of AP 201 and downlink interface 206 of AP 202.

When AP 202 receives the new packet, AP 202 strips out the header (e.g., source and destination MAC addresses) and decrypts the payload of the new packet to reveal the original packet originated from end user client 211. Based on the destination MAC address of the revealed original packet, AP 202 determines whether the original packet is destined to a local end-user client such as client 212. If the original packet is destined to a local end-user client, AP 202 then routes the original packet to the local client via local link interface 208. However, if the original packet is not destined to a local end-user client, AP 202 may repackage or re-tunnel the original packet with a source MAC address of AP 202 and a destination MAC address of a next hop, which may be an AP communicatively coupled via uplink interface 207 or another AP communicatively coupled via downlink interface 206.

Figure 3:
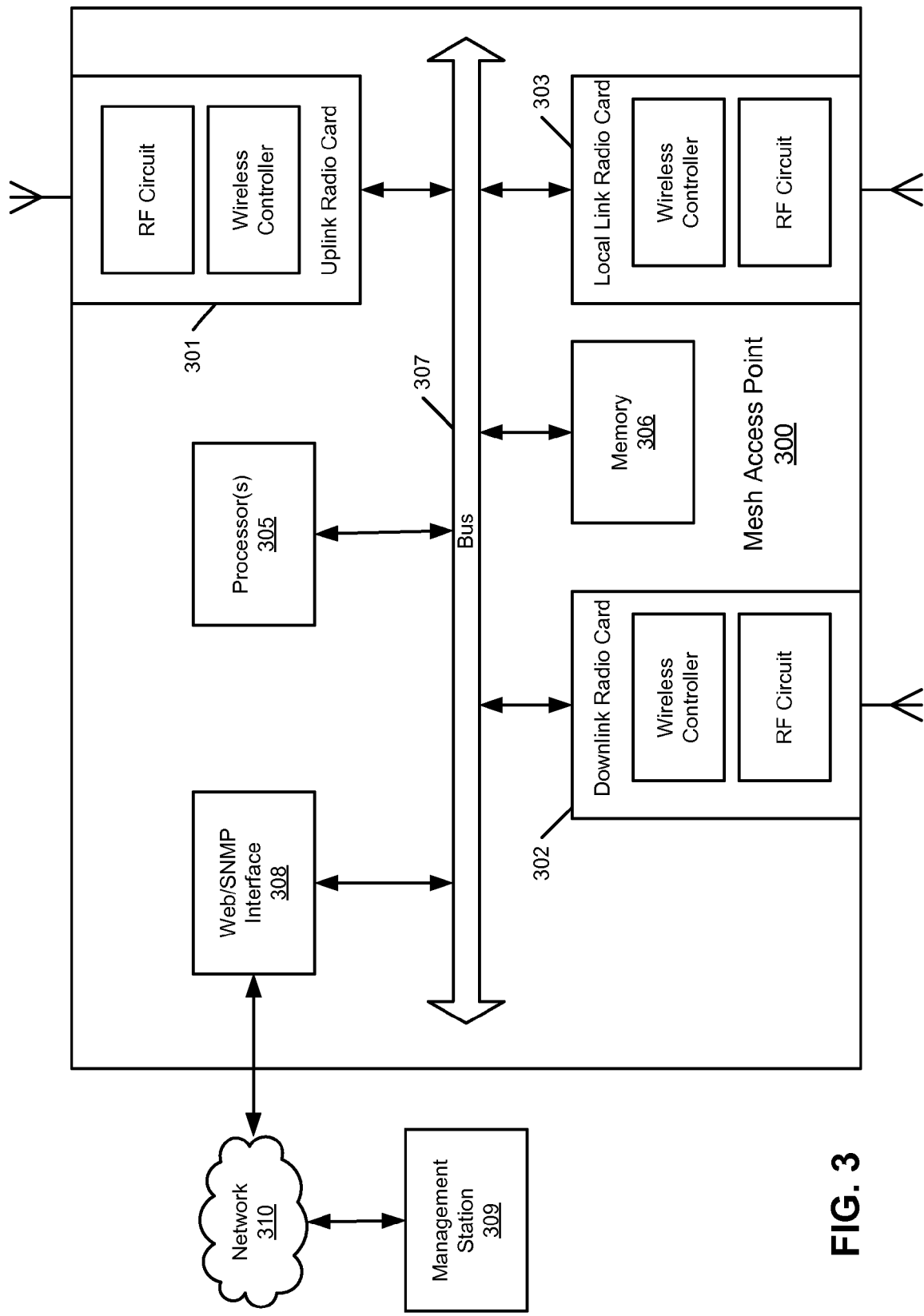
FIG. 3 is a block diagram illustrating an example of a wireless mesh access point according to one embodiment of the invention.

FIG. 3 is a block diagram illustrating an example of a wireless mesh access point according to one embodiment of the invention. For example, AP 300 may be implemented as part of AP 201 or AP 202 of FIG. 2. Referring to FIG. 3, in one embodiment, AP 300 includes, but is not limited to multiple wireless interface devices 301-303, also referred to herein as RF (radio frequency) or radio cards or devices, each having a corresponding wireless controller and necessary RF circuit, communicatively coupled to each other via bus or interconnect 307. The radio cards 301-303 may be provided by a third party vendor which also provides a software driver (e.g., layer 2 to layer 7 network driver). In this example, AP 300 includes an uplink interface card 301 that can be used to communicate with a downlink interface of another AP. AP 300 further includes a downlink interface card 302 that can be used to communicate with an uplink interface of another AP and a local link interface card 303 used to communicate with a local client.

AP 300 further includes one or more processors 305 coupled to the bus 307. In addition, AP 300 further includes a management interface 308 to allow a management station 309 to communicate with AP 300 over a network 310 for management purposes. The routing software (not shown) may be loaded within memory 306 and executed by processor 305. For example, each of the interface cards 301-304 may be configured by the management station 309 over network 310 to operate in a particular but different frequency to reduce air interference, etc. Each interface card may be assigned with a unique interface identifier (I/F ID) that uniquely identifies the corresponding interface, physically or logically (e.g., virtual). Other configurations may exist.

Figure 4:
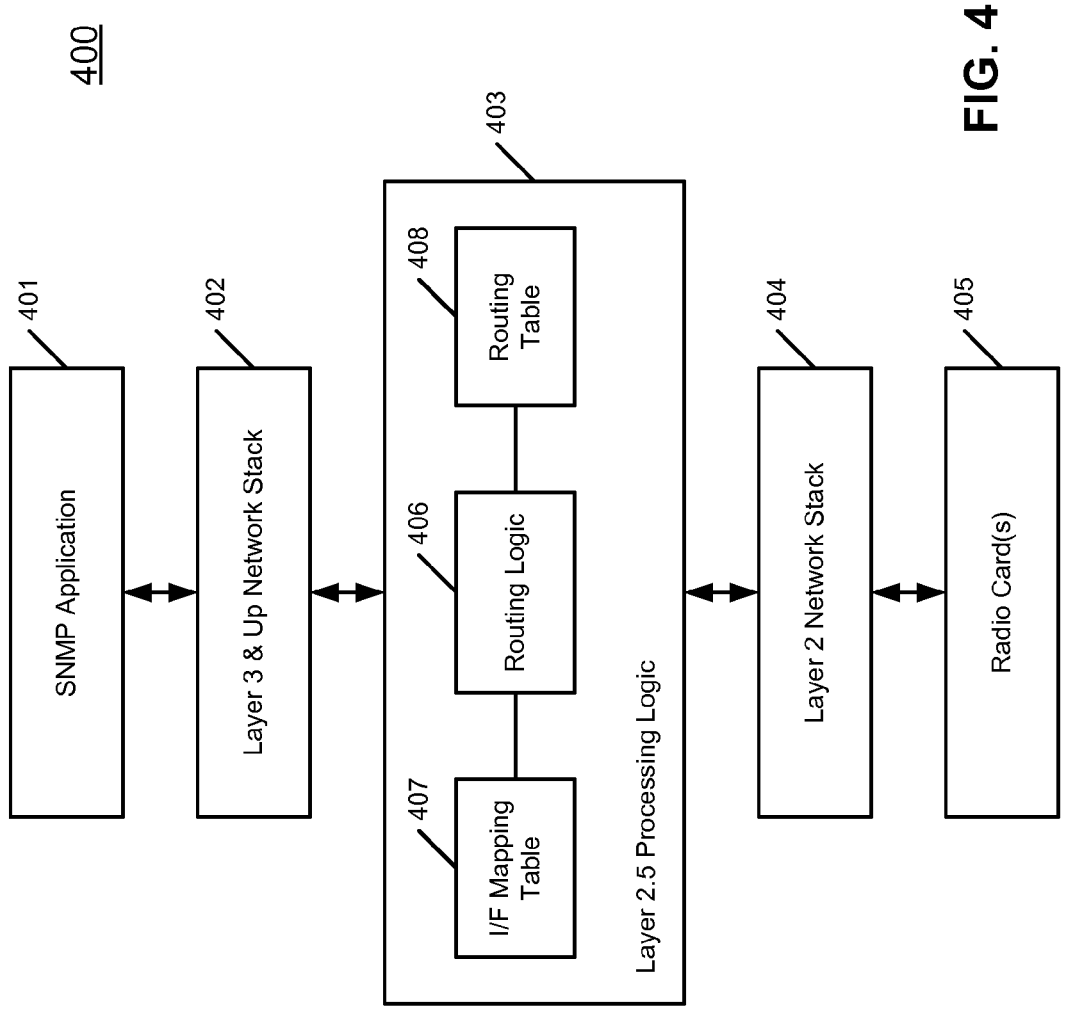
FIG. 4 is a block diagram illustrating an example of software architecture of a wireless mesh access point according to one embodiment of the invention.

FIG. 4 is a block diagram illustrating an example of software architecture of a wireless mesh access point according to one embodiment of the invention. For example, software stack 400 may be running within memory 306 by processor 305 of FIG. 3. Referring to FIG. 4, software stack 400 includes, but is not limited to, layer 3 and up network stack 402 and layer 2 404 that can process data exchanged with hardware such as radio cards 405. Radio cards 405 may be implemented as any of the radio cards 301-304 as shown in FIG. 3. Note that layer 404 and layer 402 may be provided with the hardware 405 from a third party vendor.

In addition, according to one embodiment, software stack 400 further includes layer 403, also referred to as layer 2.5 logically representing an additional layer between layer 2 and layer 3 of OSI (open system interconnection). Layer 403 includes a routing logic 406 for routing data received from different radio cards via layer 404. Any data for management application such as SNMP (simple network management protocol) application 401 is routed via layer 402. In this embodiment, since layer 403 is inserted between layer 404 and 402, the ordinary layer 2 and layer 3 do not need to modify as layer 403 is completely transparent to layers 404 and 402.

Figure 5:
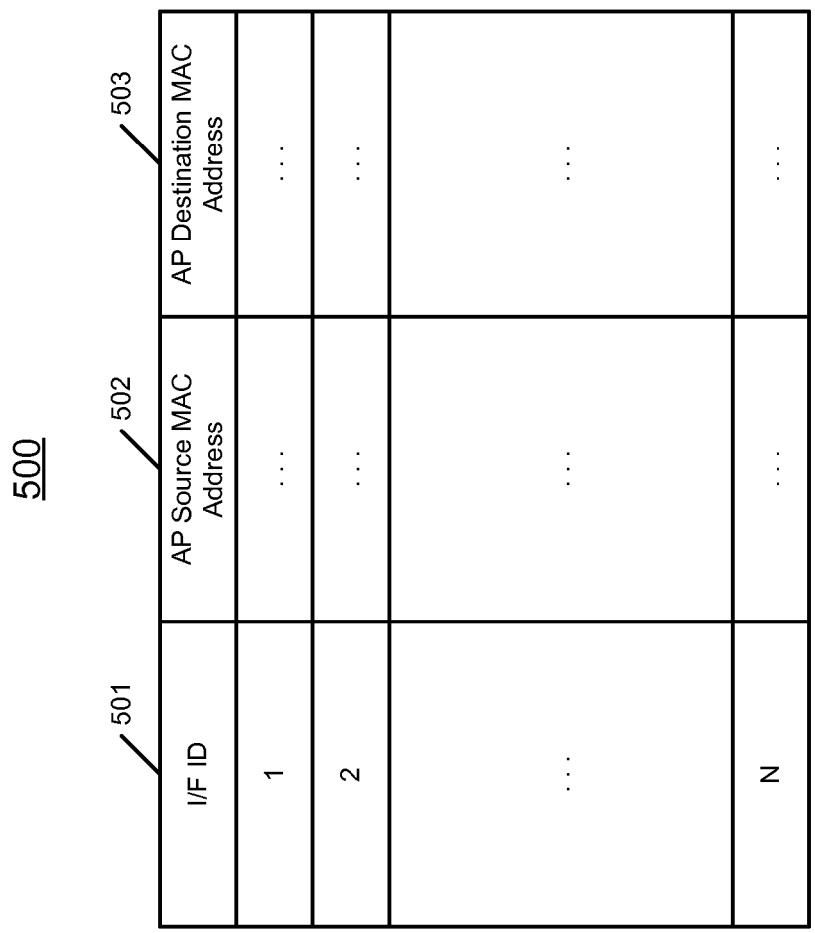
FIG. 5 is a block diagram illustrating a data structure representing a routing table according to one embodiment of the invention.

The data is routed among multiple interfaces (e.g., uplink, downlink, or local link) based on information obtained from routing table 408 and/or interface mapping table 407. Interface mapping table 407 may be implemented in a manner similar to one as shown in FIG. 5. Likewise, routing table 408 may be implemented similar to one shown in FIG. 6.

Referring to FIG. 5, interface mapping table 500 includes multiple entries. Each entry includes an interface ID field 501, a source MAC address field 502, and a destination MAC address field 503. The interface ID field 501 is used to store an ID of a particular interface of the AP. The source MAC address field 502 is used to store a MAC address corresponding to an interface card (e.g., either uplink or downlink) identified by the interface ID stored in the interface ID field 501. The destination MAC address field 503 is used to store a MAC address of an interface card (e.g., either uplink or downlink) of a next hop AP device. The interface mapping table is used by the routing logic to tunnel a packet to a next hop.

Figure 6:
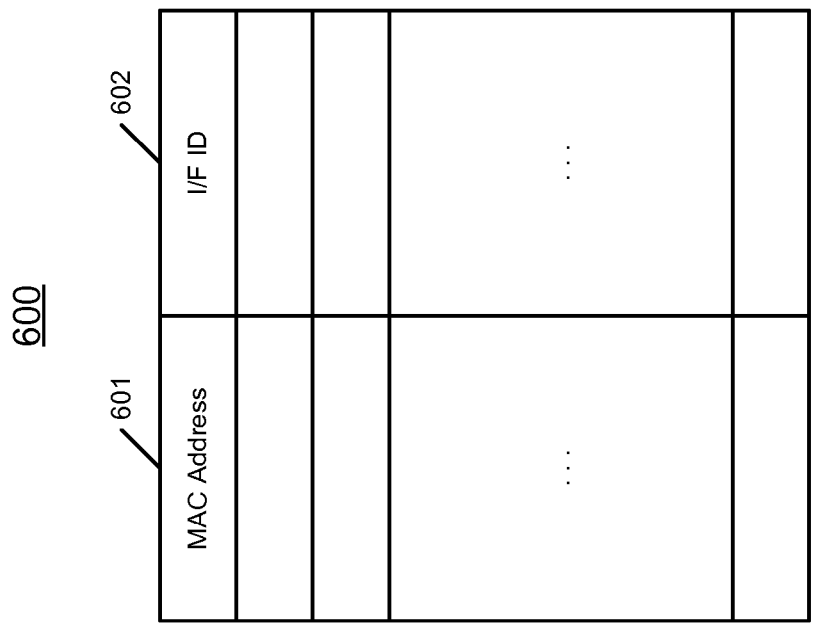
FIG. 6 is a block diagram illustrating a data structure representing an interface mapping table according to one embodiment of the invention.

Referring to FIG. 6, a routing table 600 includes multiple entries. Each entry includes a MAC address field 601 to store a particular MAC address (e.g., source or destination MAC address) and an interface ID field 602 to store an interface ID corresponding to a MAC address stored in MAC address field 601. This table is used to determine which interface card that a particular packet should be sent.

Figure 7:
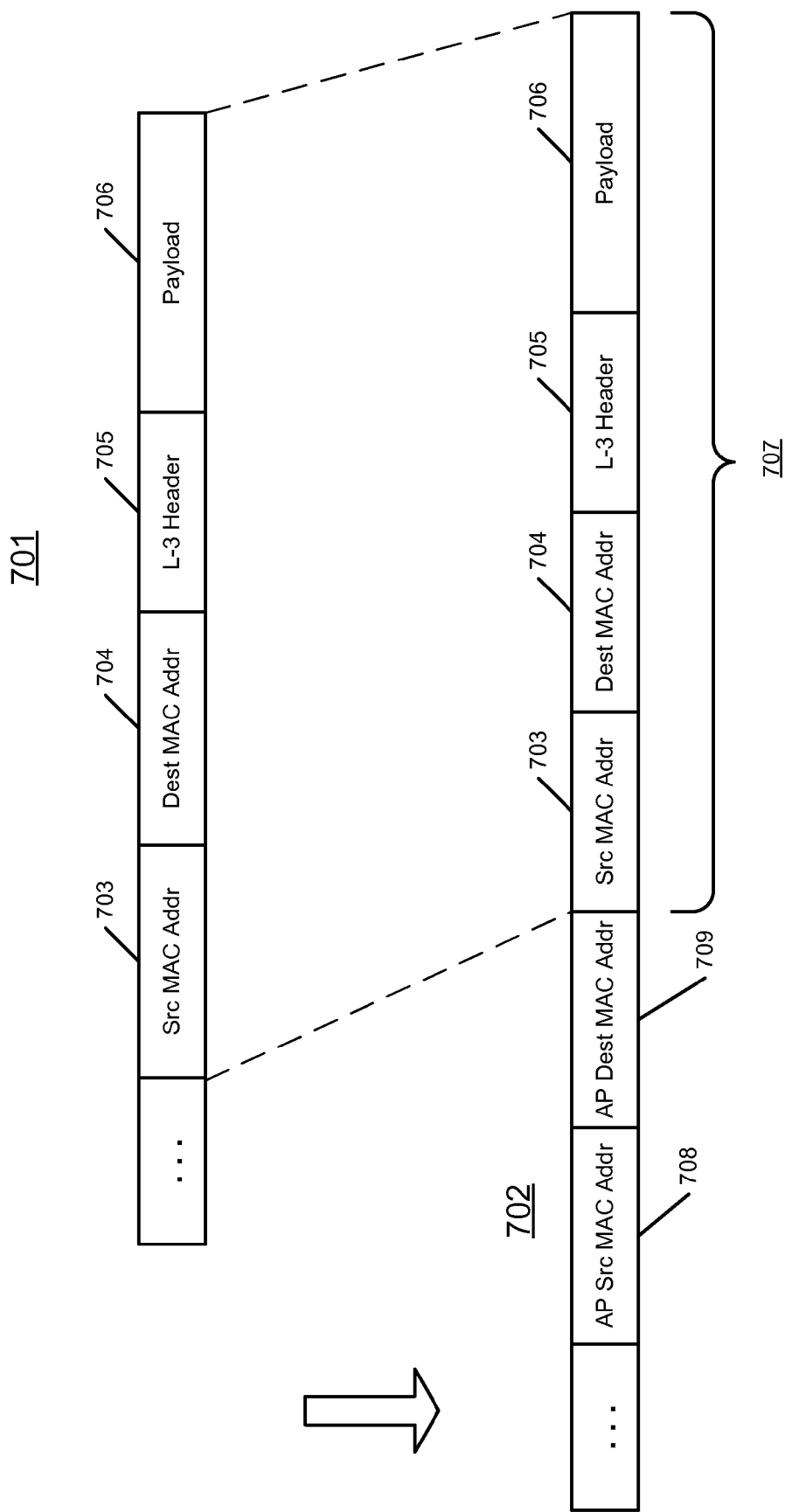
FIG. 7 is a block diagram illustrating a data packet used for tunneling according to one embodiment of the invention.

FIG. 7 is a block diagram illustrating a data packet used for tunneling according to one embodiment of the invention. Referring to FIG. 7, in this example, packet 701 is originally initiated from an end-user client such as client 211 of FIG. 2. In this example, like a standard TCP/IP packet, packet 701 includes, among others, a source MAC address 703, a destination MAC address, other layer-3 and up header 705, and payload 706.

Referring to FIGS. 2 and 7, when AP 201 receives packet 701 where AP is configured to maintain its own copy of interface mapping table (e.g., table 500 of FIG. 5) and a routing table (e.g., table 600 of FIG. 6), AP 201 may perform a lookup operation at the routing table to determine whether a source MAC address 703 (e.g., MAC address representing the end-user client 211) exists in the routing table. If not, AP 201 may store or insert a new entry into the routing table having the source MAC address 703 and an interface ID corresponding to an incoming interface of AP 201, in this example, interface 205.

In addition, according to one embodiment, AP 201 may further perform another lookup operation at the routing table based on the destination MAC address 704. It is assumed that an administrator initially has configured all the necessary routing paths in the mesh network. Thus, there should be an entry in the routing table having a MAC address corresponding to destination MAC address 704 associated with a particular interface (e.g., outgoing or egress interface) in the routing table. From the routing table, based on the destination MAC address 704, an outgoing interface ID is obtained that corresponds to, in this example, interface 203.

Further, according to one embodiment, AP 201 may further perform another lookup operation at the interface mapping table based on the interface ID obtained from the routing table to determine a pair of source MAC address 708 and destination MAC address 709, where the source MAC address 708 represents a MAC address associated with the outgoing interface of current AP and the destination MAC address 709 represents an ingress interface of a next hop AP. As a result, a new packet 702 is generated having source MAC address 708 and destination MAC address 709, where most of the original packet 701 having fields 703-706 is encrypted (e.g., tunneled) using a variety of encryption methods to generate a new payload 707 of pocket 702. Packet 702 is then transmitted to a next hop AP 202 via interface 203.

When AP 202 receives packet 702, AP 202 strips off the header having at least source MAC address 708 and destination MAC address 709 and decrypts payload 707 to reveal the original packet 701. Again, similar to operations performed by AP 201, AP 202 determines whether the revealed packet 701 is intended for its local end-user client such as client 212. If so, the revealed packet 701 is then transmitted to the local client. Otherwise, the packet 701 is then repackaged and tunneled to another AP using techniques similar to those set forth above. As a result, communications between two AP local networks can be securely performed.

Note that packets 701-702 are shown for purposes of illustration only. Other formats may also be applied. For example, instead of wrapping the original MAC addresses of the packet 701 using the AP MAC addresses to generate packet 702, the original MAC addresses of packet 701 may be replaced by the AP MAC addresses. The original MAC addresses may be relocated to some other locations such as the end of packet 702.

Figure 8:
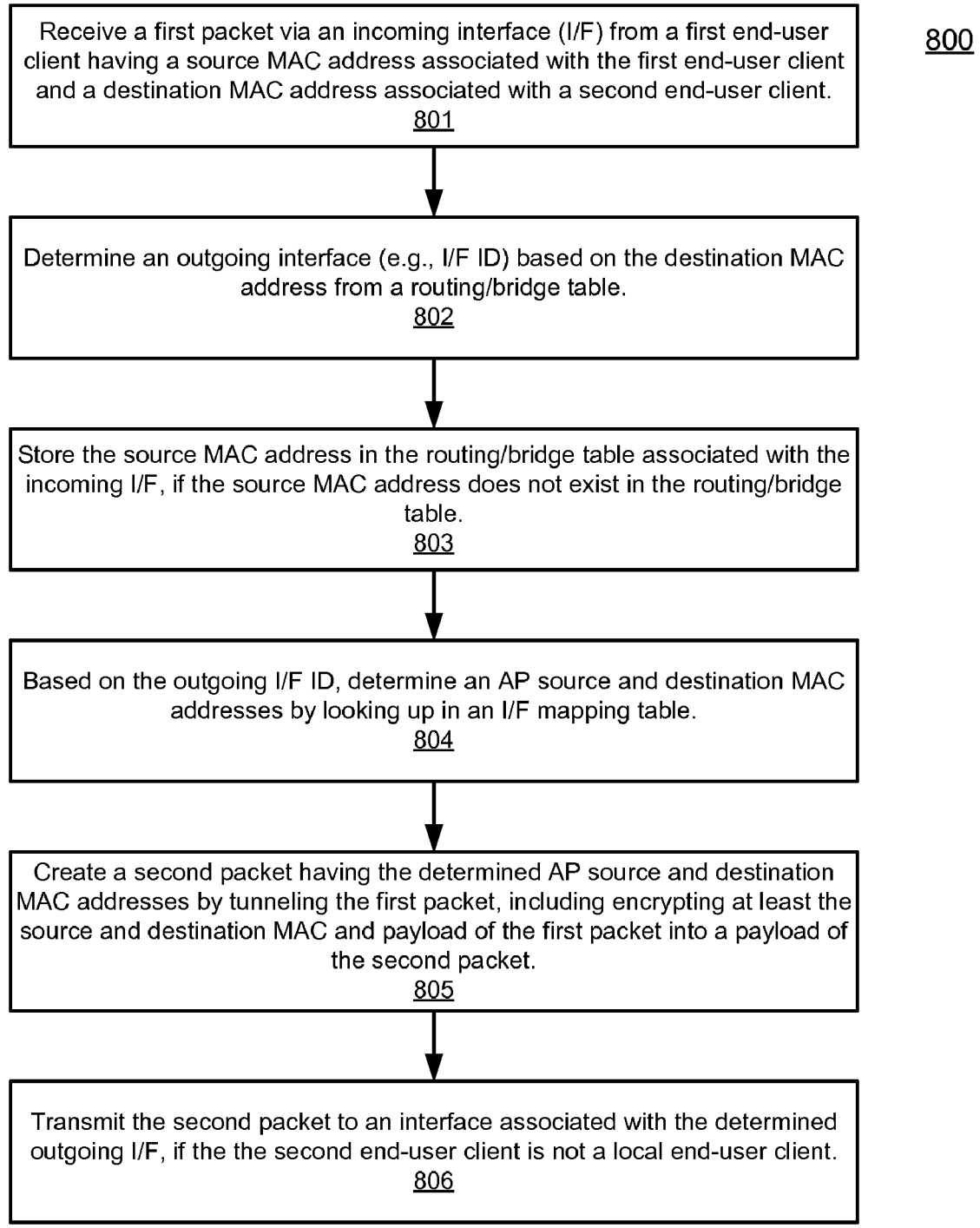
FIG. 8 is a flow diagram illustrating a process for routing a packet in a wireless mesh network according to one embodiment of the invention.

FIG. 8 is a flow diagram illustrating a process for routing a packet in a wireless mesh network according to one embodiment of the invention. Note that process 800 may be performed by processing logic which may include hardware, software, or a combination of both. For example, process 800 may be performed by a wireless mesh AP such as AP 300 of FIG. 3. Referring to FIG. 8, at block 801, a first packet (e.g., packet 701 of FIG. 7) is received via an incoming or ingress interface (e.g., local link interface) from a local end-user client having a source MAC address representing the local end-user client and a destination MAC address representing a destination end-user client.

At block 802, an outgoing or egress interface (e.g., interface ID) is determined based on the destination MAC address of the first packet. For example, the egress interface ID may be determined via a lookup operation of a routing table maintained within the respective AP (e.g., routing table 600 of FIG. 6). At block 803, if the source MAC address of the first packet does not exist in the routing table, a new entry is created in the routing table for storing the source MAC address and an interface ID corresponding to an interface from which the first packet is received.

At block 804, based on the egress interface ID determined above, an AP source MAC address and an AP destination MAC address are determined. For example, the AP source and destination MAC addresses may be determined via a lookup operation on the interface mapping table maintained within the respective AP (e.g., table 500 of FIG. 5). At block 805, a new packet or a second packet (e.g., packet 702 of FIG. 7) is created using the AP source and destination MAC address by tunneling the first packet, including encrypting at least the source and destination MAC addresses as well as the payload of the first packet. Thereafter, at block 806 the new packet is transmitted to a proper interface identified by the interface ID, which is then routed to a next hop AP.

Figure 9:
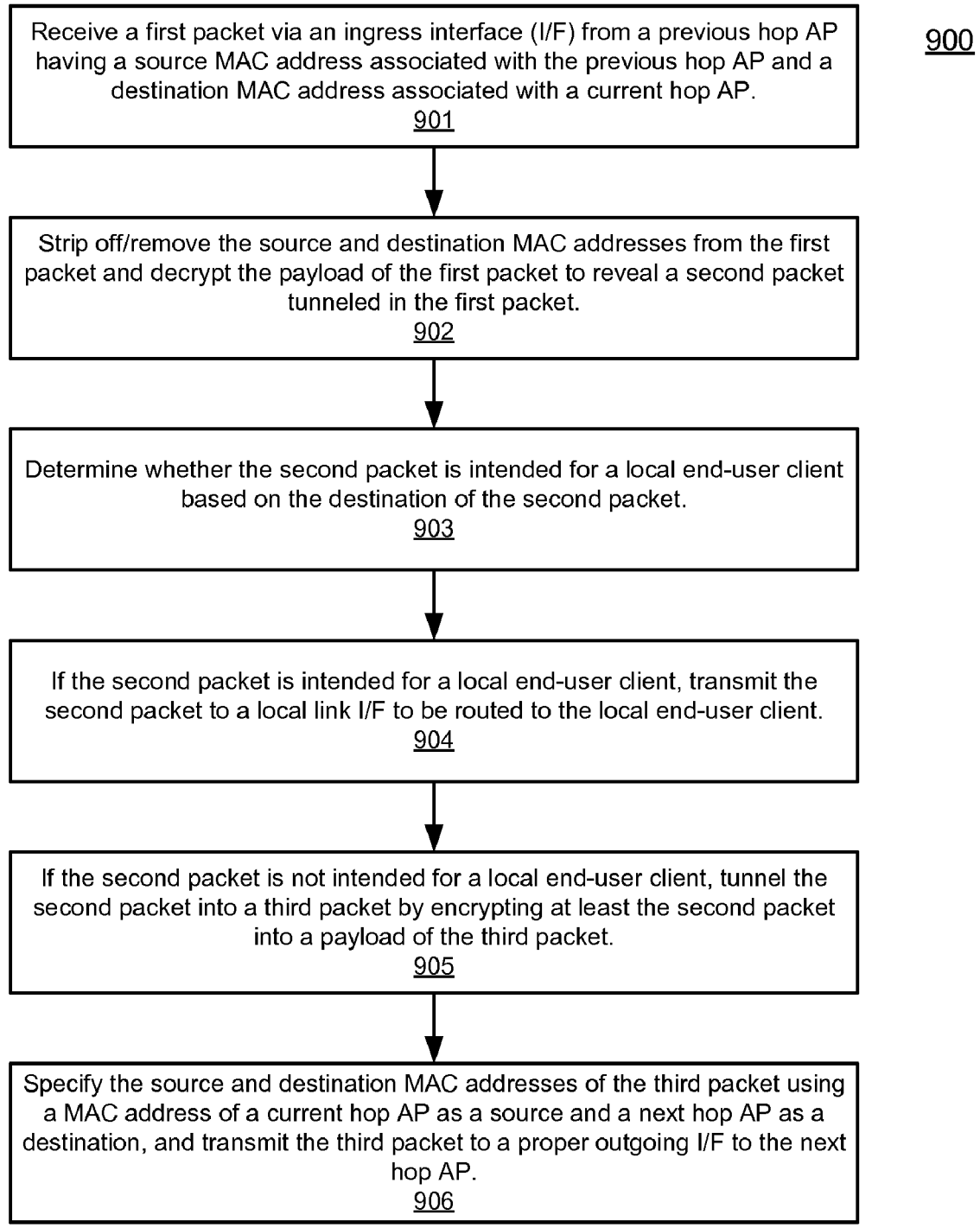
FIG. 9 is a flow diagram illustrating a process for routing a packet in a wireless mesh network according to another embodiment of the invention.

FIG. 9 is a flow diagram illustrating a process for routing a packet in a wireless mesh network according to another embodiment of the invention. Note that process 900 may be performed by processing logic which may include hardware, software, or a combination of both. For example, process 900 may be performed by a wireless mesh AP such as AP 300 of FIG. 3. Referring to FIG. 9, at block 901, a first packet is received via an incoming or ingress interface from a previous hop AP, the first packet having a first source MAC address and a first destination MAC address, as well as a payload. The first source MAC address is associated with an egress interface of the previous hop AP and the destination MAC address is associated with an ingress interface of the current hop AP. Note that the ingress interface of the current hop AP may be an uplink interface or a downlink interface. Similarly, an egress interface of a previous hop AP may be an uplink interface or a downlink interface.

At block 902, the source and destination MAC addresses of the first packet is stripped off and the payload is decrypted to reveal a second packet that has been tunneled within the first packet. The second packet includes a second source MAC address associated with a first end-user client (e.g., original end-user client that initiates the first packet form a local link) and a destination MAC address associated with a second end-user client as a destination end-user client intended to receive the first packet.

At block 903, it is determined whether the second packet is intended to a local end-user client of a current hop AP (e.g., whether the second end-user client is a local end-user client). For example, a lookup operation may be performed at a routing table maintained by the current hop AP based on the destination MAC address of the second packet (e.g., whether an interface ID corresponding to the destination MAC address of the second packet represents a local link interface of a current hop AP). If the second packet is intended to a local end-user client of a current hop AP, at block 904, the second packet is transmitted to the intended local end-user client via a local link interface of the current hop AP.

If the second packet is not intended to a local end-user client of a current hop AP, at block 905, the second packet is then tunneled within a third packet, and the third packet is then transmitted to a next hop AP using techniques similar to those set forth above. Other operations may also be performed.

Figure 10:
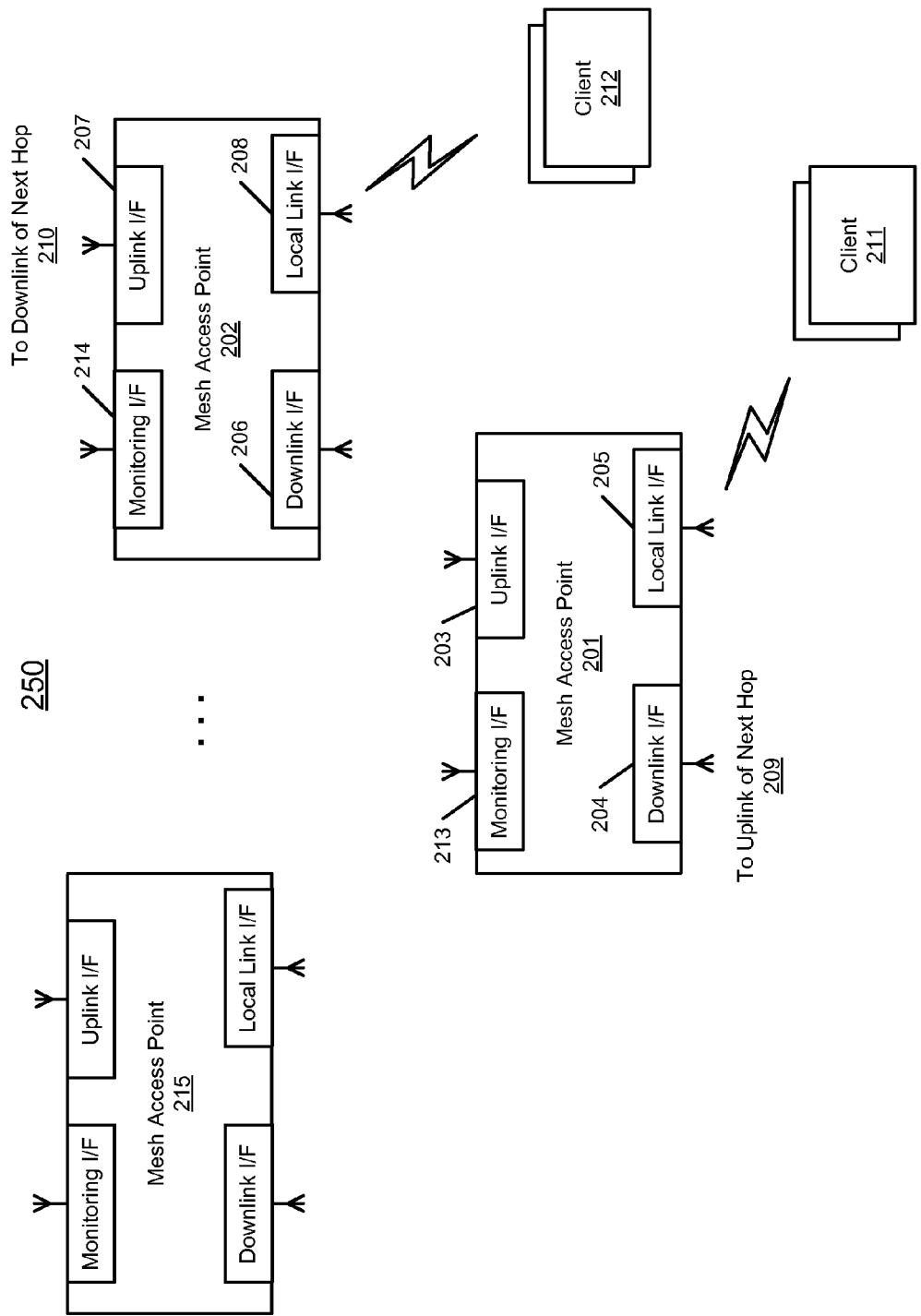
FIG. 10 is a block diagram illustrating a mesh network configuration according to another embodiment of the invention.

FIG. 10 is a block diagram illustrating a mesh network configuration according to another embodiment of the invention. For example, network configuration 250 may be implemented as part of those as shown in FIGS. 1-2. Note that for the purpose of illustration, certain reference numbers for the components having similar functionality are maintained the same. Referring to FIG. 10, similar to network configuration 200 of FIG. 2, AP 201 includes an uplink interface 203 and a downlink interface 204, as well as a local link interface 205 for local clients 211. Similarly, AP 202 includes an uplink interface 207, a downlink interface 206, and a local link interface 208 for local clients 212. Downlink interface 204 of AP 201 is used to communicate with an uplink interface of a next hop 209. Uplink interface 207 of AP 202 is used to communicate with a downlink interface of a next hop 210. Uplink interface 203 is used to communicate with a downlink interface 206 of AP 202.

Typically, a local link interface communicates with a local client using a communication frequency of approximately 2.4 GHz using a standard wireless protocol such as, for example, IEEE 802.11b/g protocol. The communication frequency of the backhaul or mesh link communications is ranging approximately from 4.9 to 5.8 GHz using a standard wireless protocol such as, for example, IEEE 802.11a protocol. However, according to one embodiment, each mesh link may operate at a different communication frequency. For example, with respect to a particular AP, the communication frequency of a downlink interface is different than the communication frequency of an uplink interface. As a result, air interference is greatly reduced.

Furthermore, the communications between downlink interface 206 of AP 202 and uplink interface 203 of AP 201 are securely performed using a tunneling protocol and/or a variety of encryption techniques. For example, when AP 201 receives a packet form a local client 211, the AP 201 encrypts almost the entire packet to generate a new packet having a source MAC address of AP 201 and a destination MAC address of AP 202. The new packet is then routed from AP 201 to AP 202 via uplink interface 203 of AP 201 and downlink interface 206 of AP 202.

When AP 202 receives the new packet, AP 202 strips out the header (e.g., source and destination MAC addresses) and decrypts the payload of the new packet to reveal the original packet originated from end user client 211. Based on the destination MAC address of the revealed original packet, AP 202 determines whether the original packet is destined to a local end-user client such as client 212. If the original packet is destined to a local end-user client, AP 202 then routes the original packet to the local client via local link interface 208. However, if the original packet is not destined to a local end-user client, AP 202 may repackage or re-tunnel the original packet with a source MAC address of AP 202 and a destination MAC address of a next hop, which may be an AP communicatively coupled via uplink interface 207 or another AP communicatively coupled via downlink interface 206.

In addition, in one embodiment, each mesh AP includes a monitoring interface (e.g., a separate wireless antenna) for monitoring purposes. For example, AP 202 includes monitoring interface 214 and AP 201 includes monitoring interface 213. In one embodiment, each AP includes a monitoring or scan logic (not shown) configured to monitor or scan via its associated monitoring interface or antenna neighboring routing information and to decide whether there is a need to reroute network traffic through a better routing path. A better path may be identified based on various information obtained by the monitoring logic from neighboring APs, such as, for example, based on signal strength, hop count, and a number of downlink stations, etc. A path having a shorter hop count, a stronger signal to noise ratio (SNR), and less number of downlink stations associated it may be a better path. Such information may be received as part of a beacon signal broadcast by each AP.

For example, with respect to AP 201, when the monitoring logic monitors and detects via monitoring interface 213 that a path via AP 215 is a better path than an existing path via AP 202, the management logic (not shown) of AP 201 may reconfigure uplink interface 203 to be associated with a downlink of AP 215, rather than the downlink of AP 202.

Further, according to one embodiment, the monitoring logic of each AP may monitor environment and to change channel assignment of the downlink channels and local link channels. The channel reassignment may be performed during and/or after routing of traffic. For example, if congestion of a particular channel of a downlink radio and/or local link radio reaches certain threshold, a new channel reassignment for the downlink and local link is performed. The congestion may be determined based on variety of parameters such as overall SNR of each AP and the number of APs currently associated with a particular channel, etc. Typically, stronger SNR of a particular channel may suggest higher probability of conflict or interference. Similarly, a channel having a higher number of downlink APs may suggest certain degrees of traffic congestion. Note that the monitoring and configuration techniques may be performed by logic (e.g., implemented in software, hardware, or both) automatically according to certain programmable algorithms that may be stored in a machine readable storage medium (e.g., memory or storage device) of the corresponding AP.

Furthermore, the monitoring logic and interface may also be used for security purposes. According to one embodiment, the monitoring logic via its monitoring antenna may monitor other surrounding APs and to determine whether a particular AP is a rogue AP (e.g., an unauthorized or non-authenticated device). In one embodiment, the monitoring logic of an AP may send a specific message to another AP and examine the response from the recipient. Based on the response (or non-response), the monitoring logic determines whether the recipient is a rogue AP. Here, given a specific message, the monitoring logic expects a specific reply. If the reply does not include a signature that matches a predetermined pattern, the recipient AP may be considered as a rogue AP. Alternatively, the monitoring logic may access or log into another AP to examine a particular key component (e.g., chip ID) to determine whether that AP is a rogue AP. If it is determined that a particular AP is a rogue AP, a message may be sent to a management system for security purposes. Other configurations may exist.

Figure 11:
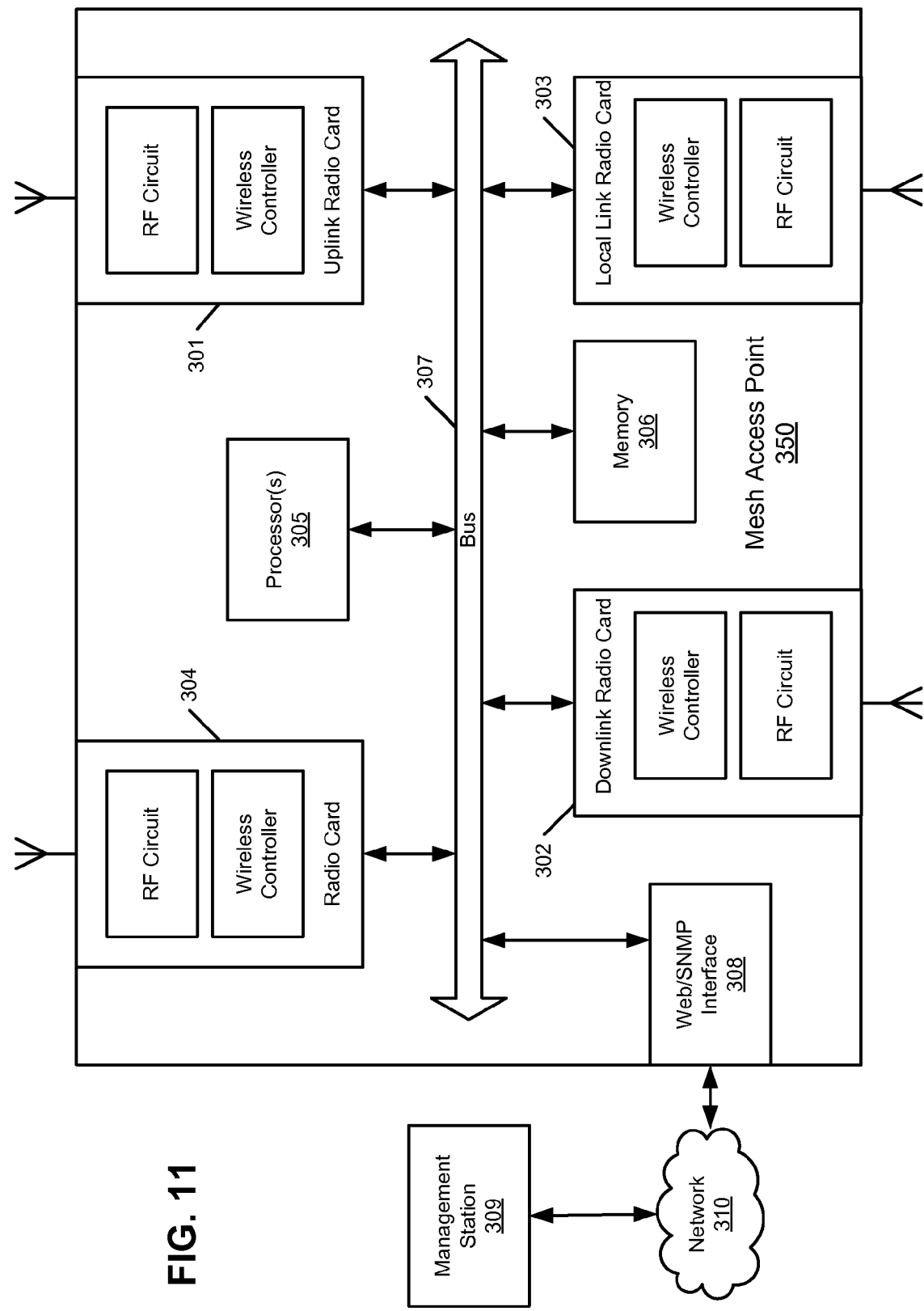
FIG. 11 is a block diagram illustrating an example of a wireless mesh access point according to another embodiment of the invention.

FIG. 11 is a block diagram illustrating an example of a wireless mesh access point according to another embodiment of the invention. For example, AP 350 may be implemented as part of AP 201 or AP 202 of FIG. 2. Referring to FIG. 11, similar to the one as shown in FIG. 3, in one embodiment, AP 350 includes, but is not limited to multiple wireless interface devices 301-304, also referred to herein as RF (radio frequency) or radio cards or devices, each having a corresponding wireless controller and necessary RF circuit, communicatively coupled to each other via bus or interconnect 307. The radio cards 301-304 may be provided by a third party vendor which also provides a software driver (e.g., layer 2 to layer 7 network driver). In this example, AP 350 includes an uplink interface card 301 that can be used to communicate with a downlink interface of another AP. AP 350 further includes a downlink interface card 302 that can be used to communicate with an uplink interface of another AP and a local link interface card 303 used to communicate with a local client.

AP 350 further includes one or more processors 305 coupled to the bus 307. In addition, AP 350 further includes a management interface 308 to allow a management station 309 to communicate with AP 350 over a network 310 for management purposes. The routing software (not shown) may be loaded within memory 306 and executed by processor 305. For example, each of the interface cards 301-304 may be configured by the management station 309 over network 310 to operate in a particular but different frequency to reduce air interference, etc. Each interface card may be assigned with a unique interface identifier (I/F ID) that uniquely identifies the corresponding interface, physically or logically (e.g., virtual). Other configurations may exist.

Furthermore, AP 350 includes a monitoring interface card 304 used to monitor or survey the mesh networks which may be used to reassign or balance the APs in the network such that the devices in the network can optimally operate. For example, monitoring interface card 304 may include monitoring logic for monitoring purposes using certain techniques described above.

As described above, each AP may actively monitor using the corresponding monitoring logic and monitoring antenna mesh links of the mesh network. If a better mesh link path is available, its uplink interface may be reconfigured to be associated with the better mesh link or path. Similarly, if a better channel is available, its downlink and/or local link may be reassigned with another channel. The monitoring features may also be utilized for fault tolerance purpose. For example, if a managing node is down and detected by a monitoring logic of an AP, the AP may notify and cause other APs to switch to another managing node of the mesh network. Once the down managing node is up and running, the monitoring logic may detect that and cause the traffic to be rerouted back to the resumed managing node. It can also be applied to redundancy purposes, where when one manager node down, all nodes will be automatically connected to next available manager node to maintain services.

This monitoring feature can be used to implement an "always connect" feature of the mesh network. Such a feature forces a mesh AP node to be associated with another node having a lower SNR if the mesh AP node does not have any other better node to establish a mesh link. The monitoring feature may also be applied to determining bandwidth scores of each mesh link, for example, based on hop count, signal quality, and mesh manager weight, etc., which may be collected through the monitoring logic and its associated monitoring interface. The bandwidth scores may affect the routing decision of each node on the mesh network. For example, more nodes may be associated with a manager node having a higher bandwidth score. Other areas may also be applied herein.

Figure 12:
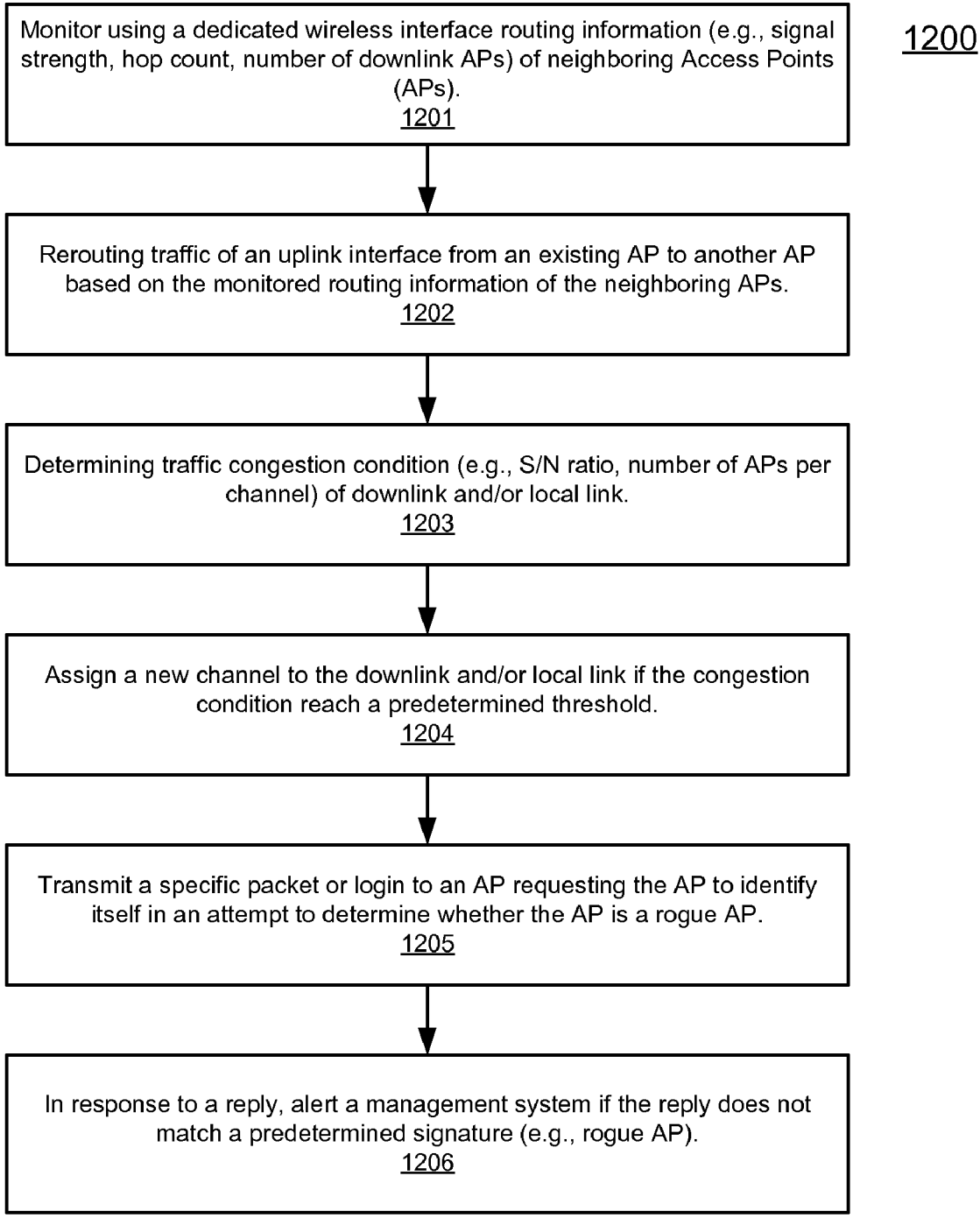
FIG. 12 is a flow diagram illustrating a method performed by a mesh AP according to one embodiment of the invention.

FIG. 12 is a flow diagram illustrating a method performed by a mesh AP according to one embodiment of the invention. Note that method 1200 may be performed by processing logic which may include software, hardware, or a combination of both. For example, method 1200 may be performed by any AP as described above. Referring to FIG. 12, at block 1201, processing logic monitors via a dedicated wireless interface (e.g., dedicated monitoring antenna) routing information (e.g., strength, hop count, number of downlink APs, etc.) of neighboring APs. Based on the monitored information, if there is a better path, at block 1202, the uplink traffic is rerouted to the better path (e.g., from one AP to another AP coupled to the uplink interface). At block 1203, processing logic monitors traffic congestion conditions (e.g., SNR, number of APs per channel, etc.) of downlink interface and/or local link interface. If there is a traffic congestion based on the monitored traffic congestion conditions, at block 1204, a new channel may be assigned to the downlink and/or local link. At block 1205, processing logic transmits via the dedicated monitoring antenna a specific message or packet to another AP requesting that AP to identify itself in an attempt to determine whether that AP is a rogue AP. Based on the response from the suspect AP, at block 1206, the management system is alerted if the response does not match a predetermined signature, which indicates that the suspect AP is a rogue AP. Other operations may also be applied.

Figure 13:
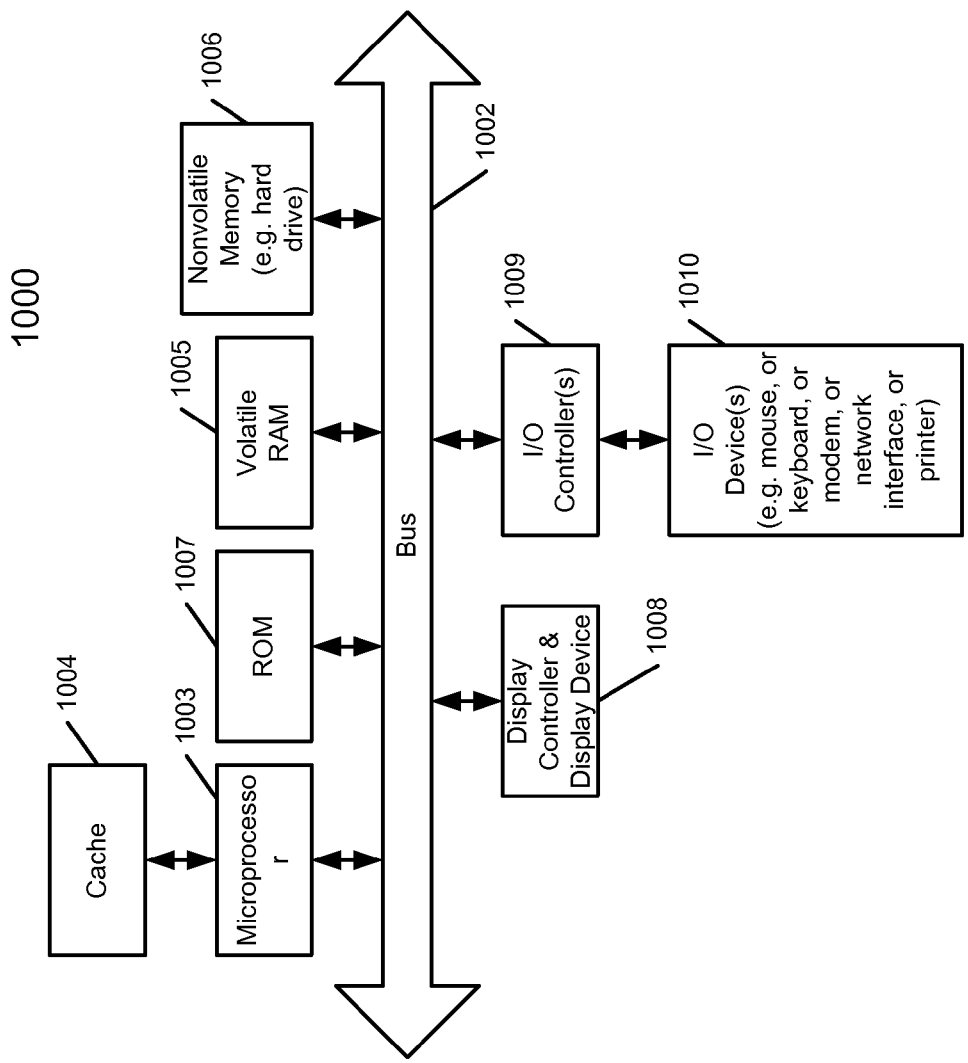
FIG. 13 illustrates a diagrammatic representation of a machine in the exemplary form of a computer system.

FIG. 13 illustrates a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The system 1000 may be used as a client, a server, a gateway device, or a wireless mesh access point described above. For example, system 1000 may be implemented as part of any of gateway 102, clients 107-114, or APs 103-106 of FIG. 1 or alternatively, management system 309 of FIG. 3. System 1000 may also be implemented as part of any AP described above.

As shown in FIG. 13, the system 1000, which is a form of a data processing system, includes a bus or interconnect 1002 which is coupled to one or more microprocessors 1003 and a ROM 1007, a volatile RAM 1005, and a non-volatile memory 1006. The microprocessor 1003 is coupled to cache memory 1004 as shown in the example of FIG. 13. Processor 1003 may be, for example, a PowerPC microprocessor or an Intel compatible processor. Alternatively, processor 1003 may be a digital signal processor or processing unit of any type of architecture, such as an ASIC (Application-Specific Integrated Circuit), a CISC (Complex Instruction Set Computing), RISC (Reduced Instruction Set Computing), VLIW (Very Long Instruction Word), or hybrid architecture, although any appropriate processor may be used.

The bus 1002 interconnects these various components together and also interconnects these components 1003, 1007, 1005, and 1006 to a display controller and display device 1008, as well as to input/output (I/O) devices 1010, which may be mice, keyboards, modems, network interfaces, printers, and other devices which are well-known in the art.

Typically, the input/output devices 1010 are coupled to the system through input/output controllers 1009. The volatile RAM 1005 is typically implemented as dynamic RAM (DRAM) which requires power continuously in order to refresh or maintain the data in the memory. The non-volatile memory 1006 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 13 shows that the non-volatile memory is a local device coupled directly to the rest of the components in the data processing system, embodiments of the present invention may utilize a non-volatile memory which is remote from the system; such as, a network storage device which is coupled to the data processing system through a network interface such as a modem or Ethernet interface. The bus 1002 may include one or more buses connected to each other through various bridges, controllers, and/or adapters, as is well-known in the art. In one embodiment, the I/O controller 1009 includes a USB (Universal Serial Bus) adapter for controlling USB peripherals. Alternatively, I/O controller 1009 may include an IEEE-1394 adapter, also known as FireWire adapter, for controlling FireWire devices.

Thus, techniques for providing multi-radio wireless mesh network solutions have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art.

An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method for configuring wireless mesh access points of a wireless mesh network, the method comprising:
monitoring by monitoring logic, via a dedicated monitoring antenna of a current mesh access point (AP), routing information of a plurality of neighboring mesh APs, the current mesh AP being one of a plurality mesh APs of a wireless mesh network, wherein each of the mesh APs includes an uplink antenna to communicate with an uplink mesh AP, a downlink antenna to communicate with a downlink mesh AP, a local link antenna to communicate with a local client of each mesh AP, and a monitoring antenna for monitoring neighboring mesh APs;
dynamically reconfiguring and rerouting traffic of an uplink antenna of the wireless mesh AP from a first routing path coupled to a first uplink mesh AP to a second routing path coupled to a second uplink mesh AP, if the second routing path has a better routing condition than the first routing path based on the monitored routing information associated with the first uplink mesh AP and the second uplink mesh AP obtained via the dedicated monitoring antenna of the mesh AP;
monitoring, via the dedicated monitoring antenna, traffic conditions of channels used by neighboring mesh APs, including an existing channel used by a downlink antenna and a local link antenna of the current mesh AP; and
dynamically assigning a new channel to a downlink interface associated with the downlink antenna of the current mesh AP if congestion of the existing channel used by the downlink interface of the current mesh AP reaches a predetermined threshold based on the monitored traffic conditions.

2. The method of claim 1, wherein the monitored routing information of an AP comprises a hop count to reach a destined node via the AP and signal strength of the AP.

3. The method of claim 1, further comprising dynamically assigning a new channel to a local link interface associated with the local link antenna of the current mesh AP if congestion of the existing channel used by the local link interface of the current mesh AP reaches a predetermined threshold based on the monitored traffic conditions.

4. The method of claim 3, wherein the traffic condition of a channel is determined based on a number of downlink mesh APs currently associated with the channel and a signal-to-noise ratio (SNR) of the channel.

5. The method of claim 3, further comprising:
transmitting via the dedicated monitoring antenna a query message to a specific neighboring mesh AP to request the specific neighboring mesh AP to identify itself;
in response to receiving a response from the specific neighboring mesh AP, examining the response to determine whether the response contains a predetermined signature associated with the mesh network; and
alerting a management system of the mesh network if the response does not contain a predetermined signature associated with the mesh network.

6. A machine-readable storage medium having instructions stored therein, which when executed by a processor, cause the process to perform a method for configuring wireless mesh access points of a wireless mesh network, the method comprising:
monitoring by monitoring logic, via a dedicated monitoring antenna of a current mesh access point (AP), routing information of a plurality of neighboring mesh APs, the current mesh AP being one of a plurality mesh APs of a wireless mesh network, wherein each of the mesh APs includes an uplink antenna to communicate with an uplink mesh AP, a downlink antenna to communicate with a downlink mesh AP, a local link antenna to communicate with a local client of each mesh AP, and a monitoring antenna for monitoring neighboring mesh APs;
dynamically reconfiguring and rerouting traffic of an uplink antenna of the wireless mesh AP from a first routing path coupled to a first uplink mesh AP to a second routing path coupled to a second uplink mesh AP, if the second routing path has a better routing condition than the first routing path based on the monitored routing information associated with the first uplink mesh AP and the second uplink mesh AP obtained via the dedicated monitoring antenna of the mesh AP;
monitoring, via the dedicated monitoring antenna, traffic conditions of channels used by neighboring mesh APs, including an existing channel used by a downlink antenna and a local link antenna of the current mesh AP; and
dynamically assigning a new channel to a downlink interface associated with the downlink antenna of the current mesh AP if congestion of the existing channel used by the downlink interface of the current mesh AP reaches a predetermined threshold based on the monitored traffic conditions.

7. The machine-readable storage medium of claim 6, wherein the monitored routing information of an AP comprises a hop count to reach a destined node via the AP and signal strength of the AP.

8. The machine-readable storage medium of claim 6, wherein the method further comprises dynamically assigning a new channel to a local link interface associated with the local link antenna of the current mesh AP if congestion of the existing channel used by the local link interface of the current mesh AP reaches a predetermined threshold based on the monitored traffic conditions.

9. The machine-readable storage medium of claim 8, wherein the traffic condition of a channel is determined based on a number of downlink mesh APs currently associated with the channel and a signal-to-noise ratio (SNR) of the channel.

10. The machine-readable storage medium of claim 8, wherein the method further comprises:
transmitting via the dedicated monitoring antenna a query message to a specific neighboring mesh AP to request the specific neighboring mesh AP to identify itself;
in response to receiving a response from the specific neighboring mesh AP, examining the response to determine whether the response contains a predetermined signature associated with the mesh network; and
alerting a management system of the mesh network if the response does not contain a predetermined signature associated with the mesh network.

11. A wireless mesh access point (AP), comprising:
an uplink interface to wirelessly communicate with an uplink mesh AP;
a downlink interface to wirelessly communicate with one or more downlink mesh AP;
a local link interface to wirelessly communicate with one or more local clients;
a monitoring interface;
a monitoring logic configured to, via a monitoring interface, routing information of a plurality of neighboring mesh APs associated with a wireless mesh network, wherein each of the mesh APs includes an uplink antenna to communicate with an uplink mesh AP, a downlink antenna to communicate with a downlink mesh AP, a local link antenna to communicate with a local client of each mesh AP, and a monitoring antenna for monitoring neighboring mesh APs;

a routing logic configured to dynamically reconfigure and reroute traffic of the uplink interface of the wireless mesh AP from a first routing path coupled to a first uplink mesh AP to a second routing path coupled to a second uplink mesh AP, if the second routing path has a better routing condition than the first routing path based on the monitored routing information associated with the first uplink mesh AP and the second uplink mesh AP obtained via the monitoring interface of the mesh AP, wherein the monitored routing information of an AP comprises a hop count to reach a destined node via the AP and signal strength of the AP, and wherein the monitoring logic, via the monitoring interface, is configured to monitor traffic conditions of channels used by neighboring mesh APs, including an existing channel used by the downlink interface and the local link interface of the mesh AP, and wherein the routing logic is configured to dynamically assign a new channel to the downlink interface of the mesh AP if congestion of the existing channel used by the downlink interface reaches a predetermined threshold based on the monitored traffic conditions.

12. The wireless mesh AP of claim 11, wherein the monitored routing information of an AP comprises a hop count to reach a destined node via the AP and signal strength of the AP.

13. The wireless mesh AP of claim 11, wherein the routing logic further dynamically assigns a new channel to the local link interface of the mesh AP if congestion of the existing channel used by the local link interface reaches a predetermined threshold based on the monitored traffic conditions.

14. The wireless mesh AP of claim 13, wherein the traffic condition of a channel is determined based on a number of downlink mesh APs currently associated with the channel and a signal-to-noise ratio (SNR) of the channel.

15. The wireless mesh AP claim 14, wherein the monitoring logic is further configured to
- transmit via the monitoring interface a query message to a specific neighboring mesh AP to request the specific neighboring mesh AP to identify itself,
- in response to receiving a response from the specific neighboring mesh AP, examine the response to determine whether the response contains a predetermined signature associated with the mesh network, and
- alert a management system of the mesh network if the response does not contain a predetermined signature associated with the mesh network.

* * * * *